United States Patent

[11] 3,604,334

[72] Inventor Earle W. Ballentine
 3641 Via Polomino, Palos Verdes Estates, Calif. 90274
[21] Appl. No. 553,065
[22] Filed May 26, 1966
[45] Patented Sept. 14, 1971

[54] APPARATUS AND METHOD FOR THAWING FROZEN FOOD
 23 Claims, 9 Drawing Figs.
[52] U.S. Cl. ................................................. 99/234, 126/369
[51] Int. Cl. .................................................. A23l 1/00
[50] Field of Search .................................... 126/369, 369.1, 379, 377; 99/1, 234, 324, 349, 259, 325, 194

[56] References Cited
UNITED STATES PATENTS

| | | | |
|---|---|---|---|
| 1,850,031 | 3/1932 | Rayson | 99/234 |
| 1,955,289 | 4/1934 | Greenfield | 99/1 |
| 3,071,473 | 1/1963 | Churley | 99/234 X |
| 2,500,219 | 3/1950 | Troupe | 219/399 |

Primary Examiner—Robert W. Jenkins
Attorney—Smyth, Roston & Pavitt

ABSTRACT: A device for thawing and heating frozen food, having a chamber with means for supporting frozen food. A mixture of hot gases and water vapor is forced in turbulent flow over the frozen food.

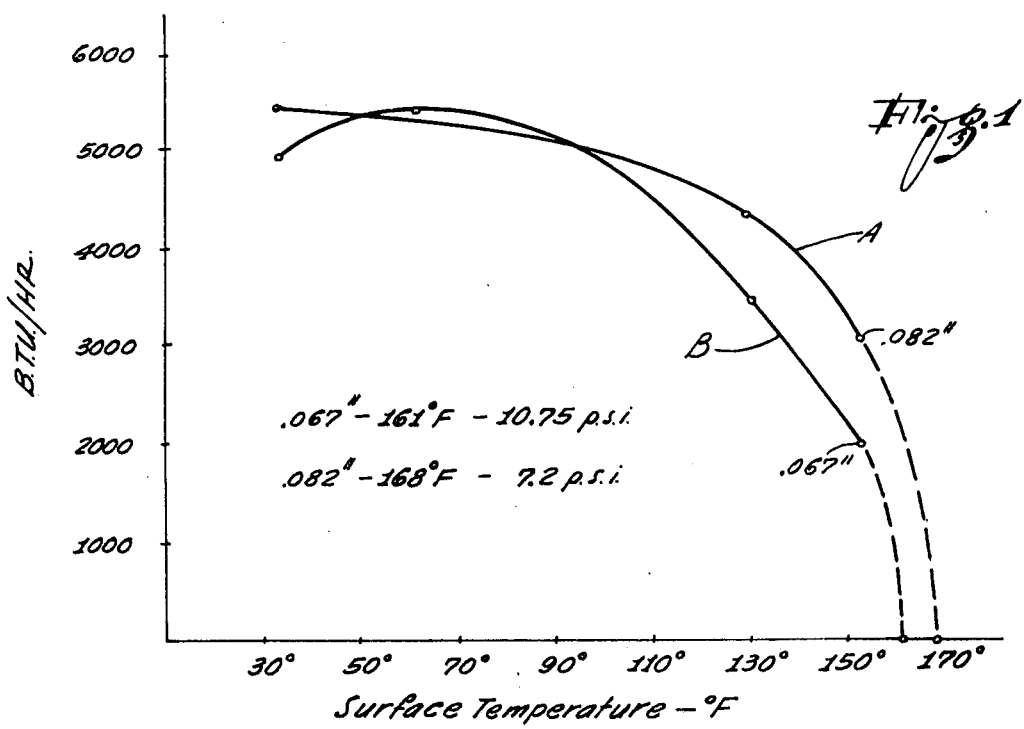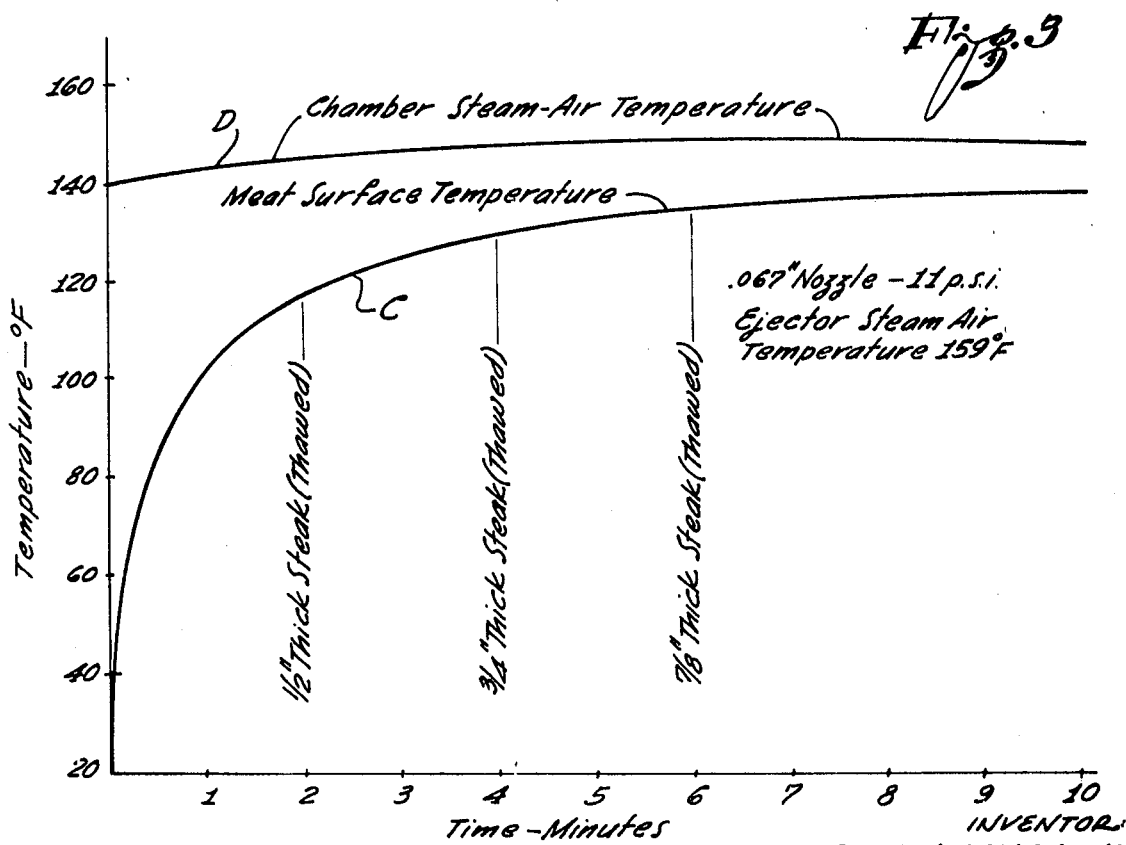

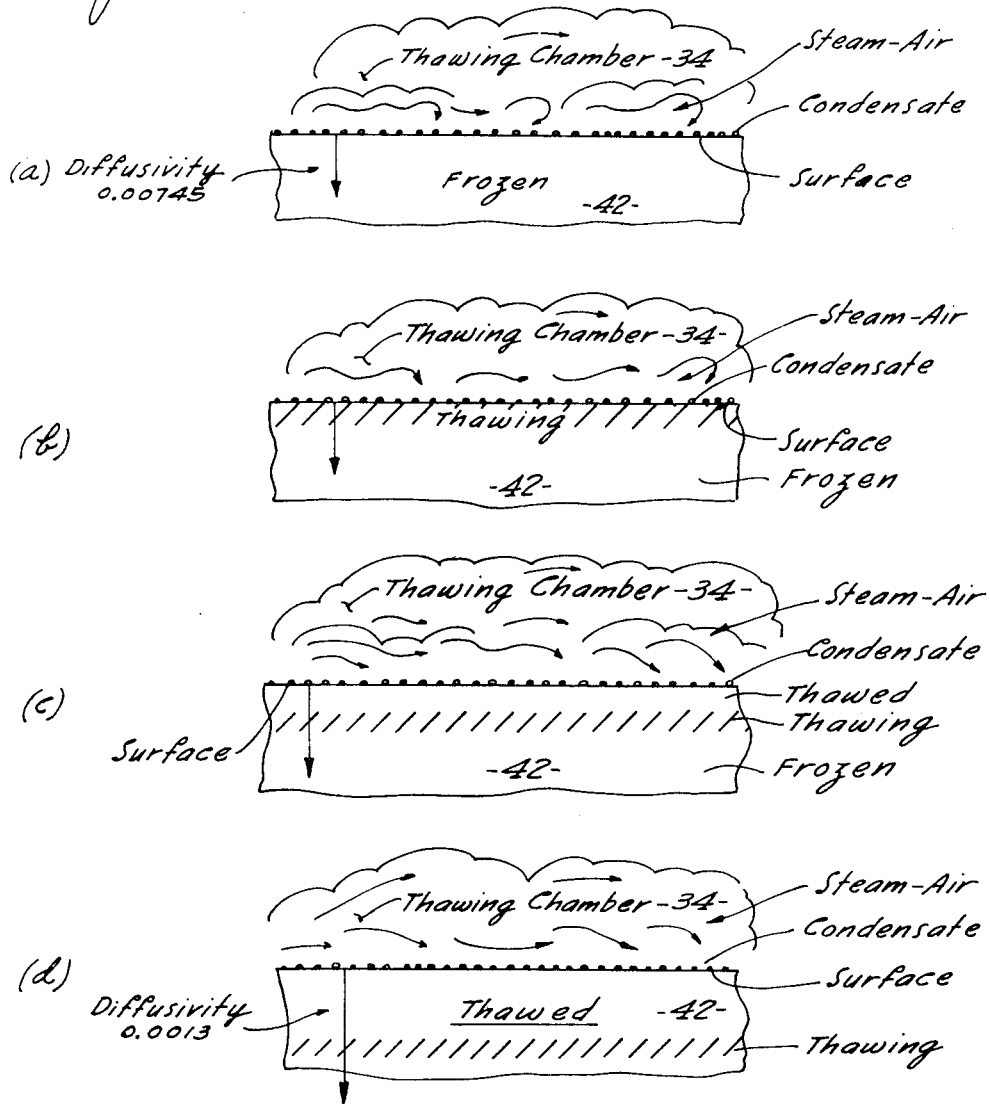

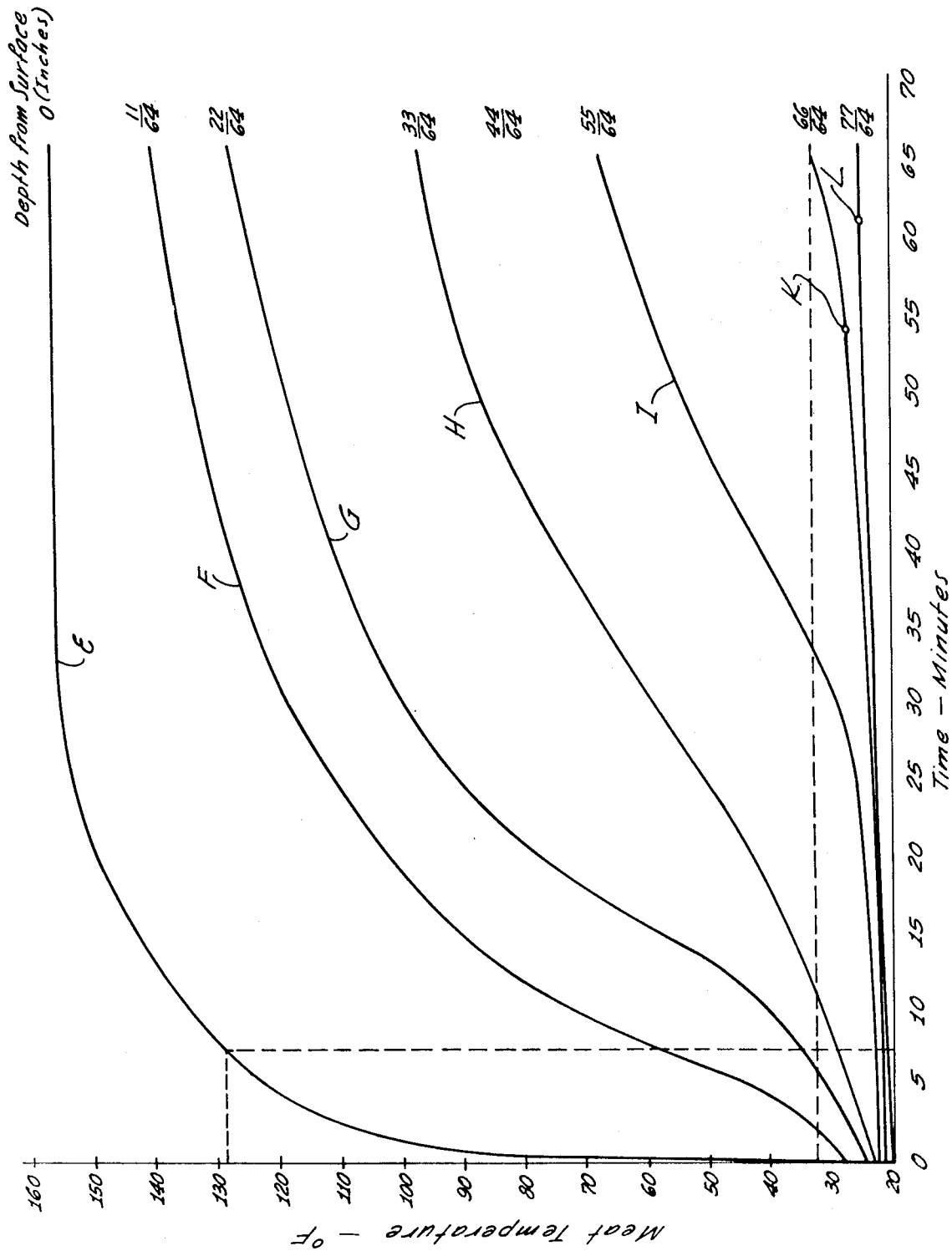

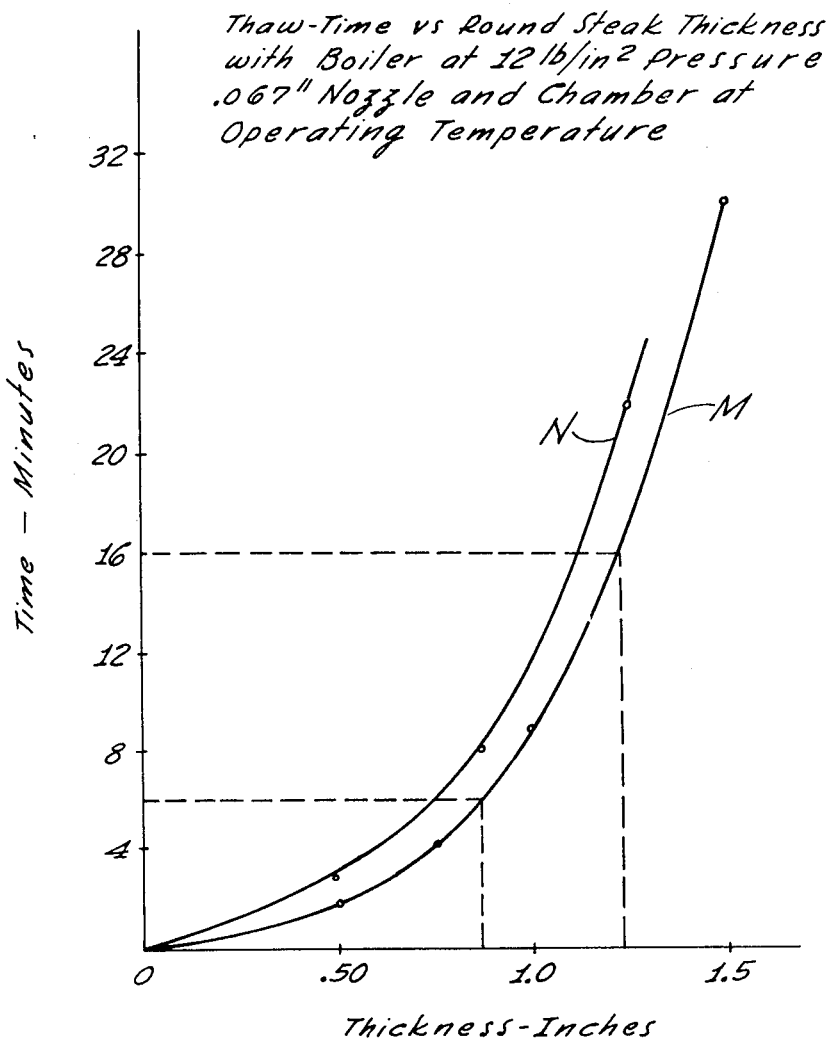

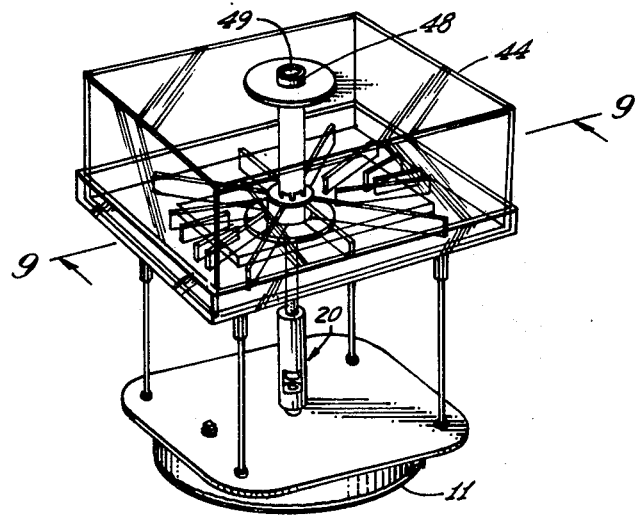
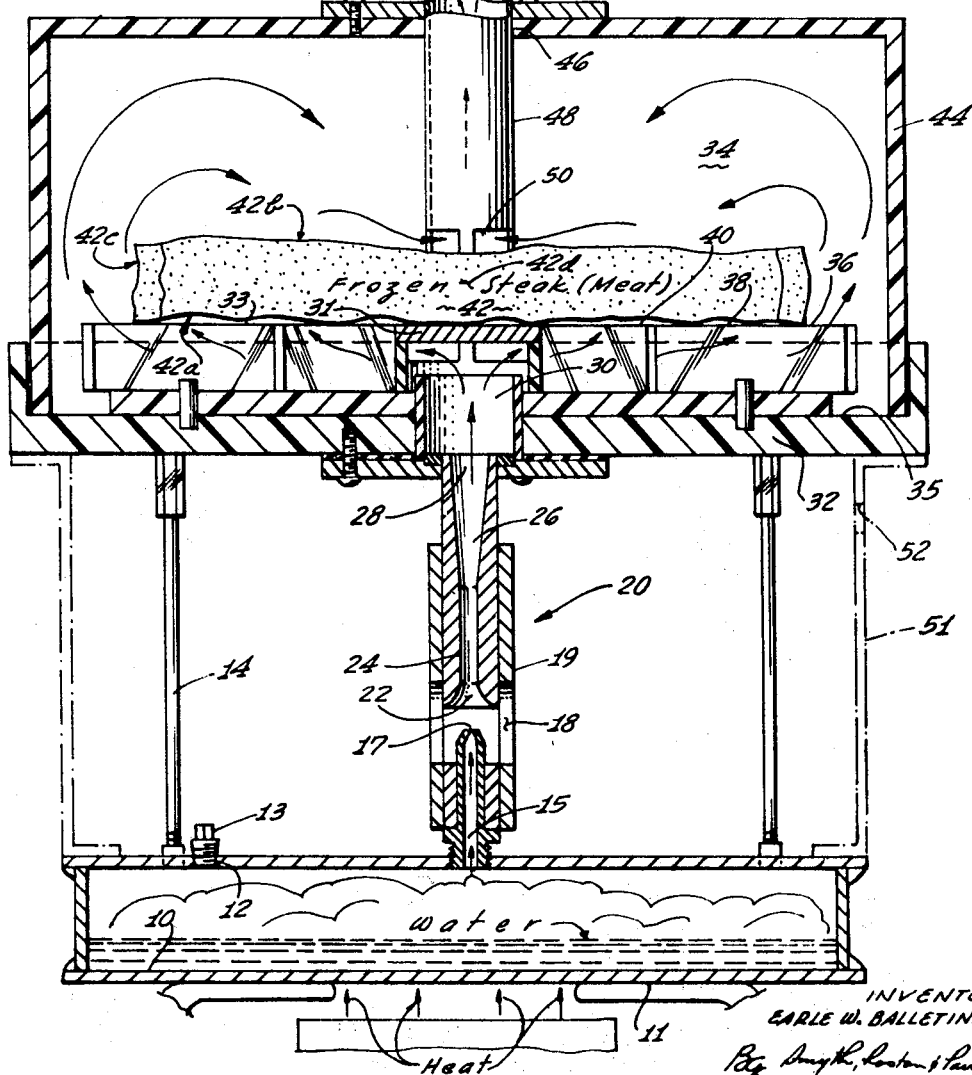

APPARATUS AND METHOD FOR THAWING FROZEN FOOD

The present invention relates to a method and apparatus for thawing of frozen food.

For quite some time widespread use has been made of deep freeze refrigeration of foodstuff for both, large quantities of food in commercial transportation and storage, and small quantities of food for home storage. Of particular interest here are meat, fish and fowl. When time is not of the essence, thawing presents no problem since every frozen item will, in due time, thaw when exposed to normal ambient or room temperatures. It is well known, however, that food kept in a home type or restaurant type deep freezer requires many hours before thawing has been completed.

Where meals can be planned well in advance, this long thawing time presents no problem. However, where a meal is to be prepared on rather short notice, "natural" thawing in room temperature is too time consuming. Consequently, the need arises, and quite often so in modern living, to fast-thaw meat, fish or fowl. The same holds true for other food, but with different results. Frozen vegetables may well be placed directly in boiling water without impairment of quality. Not so meat, as many a householder may have experienced when attempting to defreeze meat by means of boiling water, in a frying pan, or in the oven; the meats loses all flavor, dries out, is "well done," or even burnt on the outside, while the inside is still cold or even frozen, i.e., the result is a rather pitiful piece of tasteless meat. For fish and fowl the situation is quite similar.

The reason for this is quite simple. For thawing, extensive quantities of heat have to be supplied to the frozen foodstuff, and here particularly to the interior thereof. Heat is transported from one place to another by various processes, all requiring the existence of a temperature differential. The larger the differential the larger will be the amount of heat transported. Thus, it appears "obvious" to apply as much heat to the surface of a frozen piece of food so that a temperature differential is set up as against the interior to induce a flow of heat.

In order to induce a high temperature differential, a heat source operating at a high temperature is brought into contact with the meat. I shall now consider the several commonly available heat sources which can be employed for this purpose. The worst case from the standpoint of result, is a frying pan; it contacts, for example, meat at least at first, at only isolated points, because the surface of the piece of meat is irregular even if carefully cut. Thus, in the normal case the meat will contact the pan in only three points. The meat at these three points will thaw fast and very soon will begin to fry. Slowly the rest of the downwardly directed surface will thaw also and only when the piece lies flat on the pan, broad contact with the hot pan is made. It follows that most of the lower surface will contact the pan when already thawed, and those portions of the pan could heat up quite excessively thereafter. Thus, frying of the entire under surface will begin vigorously. As thawing progresses, so does frying, and even thin pieces of meat will begin to char before the top is fully thawed.

If one puts the pan in the oven, the meat will be enveloped by hot air so that the thawing process does not merely progress from the area of contact between the meat and a planar heat source; thus instead of charring one side of the meat, the hot air will begin to cook the entire surface and the meat will again at the surface be well done before the interior has thawed. If one places the meat into boiling water, immediately juices, vitamins, etc. will be leached out and extracted from the surface portion of the meat and the meat will also begin to stew because of the contact with the boiling water. Again, this cooking process will have well advanced long before the interior of the meat has thawed. If one would leave a plastic or the like wrapping around the meat, very soon there would develop a hovering gaseous layer between the meat and the wrapping, providing quite effective heat insulation so that the thawing would be extremely slow while, on the other hand, the cooking process may begin anyhow. Thus, for all these known methods and depending, of course, on the thickness of the piece of frozen food, it will be partially cooked, be well done or stewed, dried out or even be charred by the time the interior is thawed.

One can see that as long as the heat is applied to the food with a high temperature gradient, it raises the temperature above the cooking temperature at least at the surface, and the boiling point of water, for example, is already well above the minimum cooking temperature for the meat. Thus it is impossible to prevent cooking if one thaws in this manner. There always will be cooking at the surface while the thawing is still not completed in the interior. For very high temperatures as applied, the thawing process will be fast, but so will be the cooking process at the surface. The result is a very irregularly cooked piece of meat.

This leads to the conclusion that thawing must not be carried out at a temperature at which the meat will begin to cook, or at least the cooking process should be so slow that thawing is completed long before any noticeable discoloration may take place. If one places a piece of frozen food into contact with a hot plate having a temperature of, say, 150° F., the defreezing is quite slow, because the frozen food will be in contact with the heating surface only on one side. True, it will thaw faster than at room temperature, but heating on one side is not at all satisfactory, and it is quite apparent that the reduction of thawing time from, say 5 hours to 3 hours, is not much of an improvement, and that part of the surface contacting the hot plate will still dry out or cook. If one places the meat into warm water of, for example, 150° F., thawing may not be too slow, but I have observed that even here after a few minutes there begins a discoloration on the surface and after about ten minutes the meat has to some extent stewed for about 1-16 of an inch thickness measured from the surface. Apparently warm water thawing is nothing but a warm water leaching process. Vigorous flow of water around the meat promotes this leaching quite extensively.

The specific problem here is presented by the fact that the cooking process of protein, albumen and vegetable matter is temperature dependent in that they cook faster for a high externally applied temperature than for a low one. It is thus necessary to distinguish between long and short term cooking temperatures. While "short" and "long" have relative meaning, one can define as short time or short term cooking the cooking as produced normally by externally applying heat at a temperature above the boiling point of water; long term cooking may occur at low temperatures of, for example, 200° F. and below, down to, for example, 130°. For these temperature ranges, cooking is in fact produced, provided the temperature is applied long enough to the surface of the food. For this definition of cooking it is not material if at that particular temperature in what we call the long term temperature range, there actually is cooking in the sense of tenderizing. The principal aspect is that for these temperatures when applied to and maintained at the surface in a manner permitting extraction of moisture and/or solvents of the meat for a considerable period of time, the surface discolors. Depending on the mode of heat transfer carried out in the long term temperature range, the surface will dry out or be leached out. The extracted moisture and solvents, and that is what constitutes the juice can escape; we regard this as cooking. The lowest cooking temperature will depend on the type of food, of course, but, for example, for albumen 130° is a reasonable lower limit which when applied long enough, will produce some cooking.

This means specifically that upon thawing with these known methods and for temperatures above 130° one cannot prevent cooking of the surface because of the long time that the thawing temperature has to be applied to have any effect. Thus, thawing at a rather low temperature takes a long time but even this slow thawing process may still be accompanied by a long term cooking process at the surface. If one lowers the equipment temperature below 130° F. cooking will be prevented indeed, but thawing is extremely slow, practically no faster than at room temperature. Thus, thawing without cooking appears to be a slow process.

I have now discovered a method for thawing food and I have devised preferred equipment for practicing the method, which does not have the deficiencies of known methods of fast thawing. In particular, I have discovered how one can thaw fast without cooking. I suggest utilization of a rather high, long term cooking temperature to which the food is to be subjected, whereby the heat transport to the food is so efficient that the food thaws before it can cook without concurrent leaching.

In accordance with the principles of the invention, I use the latent heat of vaporization of a vapor to supply the amount of thermal energy required as heat of fusion for thawing frozen foodstuff. The flow of vapor envelopes substantially the entire piece or pieces of food to be thawed, so that vapor condensates continuously at substantially all portions of the surface of this piece of food. The flow pattern should have directions normal to all sides of the piece of food and at substantially every surface portion thereof. Preferably, the vapor should flow around the piece with vigorous turbulence.

In particular I use the condensation of steam at the surface of frozen food to provide for a very high rate of heat transfer to the piece of food. This mode of heat transport is considerably more efficient than any other kind of heat conduction under comparable temperature conditions. Due to a continuous turbulent flow of vapor such as steam towards and along practically the entire surface of the frozen piece of food, fresh vapor is supplied continuously to substantially all of the surface portions of the originally frozen piece of food. In order to prevent cooking, the vapor, such as steam, is mixed with a gas, such as air, at a ratio so that the temperature of the mixture at the pressure prevailing around the frozen piece of food, is below the temperature required for cooking the surface of meat in the same period of time that is needed for thawing it.

I have observed here the astonishing fact that a steam-air mixture of about 150° F. produces practically no discoloration after about 10 minutes of application, whereas a like piece of meat after having been in water of 145° F. for 10 minutes was already gray. Thus, from a different point of view, I suggest to cause thin film condensation to precipitate on the surface of a piece of frozen food for a period of time so that sufficient thermal energy is developed for thawing, whereby the temperature of the steam when condensating has a value below the boiling point of water. The temperature, however, has a value so high that water of like temperature when permitted to flow around the meat would produce after a few minutes noticeable leaching, i.e., graying of the surface of the meat. The condensate which forms on the surface, however, produces practically no leaching whatever.

For purposes of the invention, I define the beginning of cooking of meat as the beginning of a noticeable discoloration and/or of appreciable loss of juice. For beef, discoloration is the change from red to gray, and for fowl a change from white-yellow to brownish yellow. Thus, the steam-air mixture should have a temperature which is a long term cooking temperature, but when applied only for a period of time needed to thaw the piece of food, no cooking occurs, because the utilization of condensation for heat transfer provides a fast enough transfer of heat so that thawing is completed before cooking at the surface may begin. It is thus important that the effect of "short term" and "long term" heat application depends to a considerable extent on the mode of heat application, and I found that the application of a steam-air mixture when provided for a period when there is still vigorous condensation on the surface of the piece or pieces of frozen food, does not produce cooking, i.e., discoloration, loss of juice, etc., even if a temperature for the steam-air mixture is used which would produce cooking if applied by other heating means such as warm water, for the same period of time. Moreover, I have found that the steam-air mixture, when so used, will produce considerably faster thawing than any other of the known heating means. I have found that a temperature of 140° to 150° for a steam-air mixture as it flows around the food is most suitable. A steak which is about 3-4 inch thick can be thawed completely in about 6 minutes, with no cooking, i.e., no discoloration, no loss of juice, flavor and appearance.

The inventive method and an embodiment for practicing the method will be explained with reference to the drawings, in which:

FIG. 1 illustrates two measured curves respectively showing the development of thermal energy by condensation as a function of surface temperature and for two different mixtures of air and steam;

FIG. 3 illustrates two measured curves, both plotted as functions of temperature, one curve showing the mixing ratio of air and steam for the several temperatures, the other one showing pressure in the boiler developing the steam for the mixture;

FIGS. 4a to 4d show schematically the progress of thawing from the surface of a piece of meat into the interior thereof;

FIG. 5 shows several measured curves representing temperature as a function of time and having depths from the surface into a piece of originally frozen meat, as parameter;

FIG. 6 illustrates actual thawing time and total thawing time as a function of meat thickness, the measured curves differing by noninclusion or inclusion of the time for preheating the exact amount of water to be evaporated for completing thawing;

FIG. 8 illustrates in perspective view a thawing device in accordance with the present invention for home kitchen use; and FIG. 9 illustrates a sectional view into the thawing device shown in FIG. 8.

Figure 7:
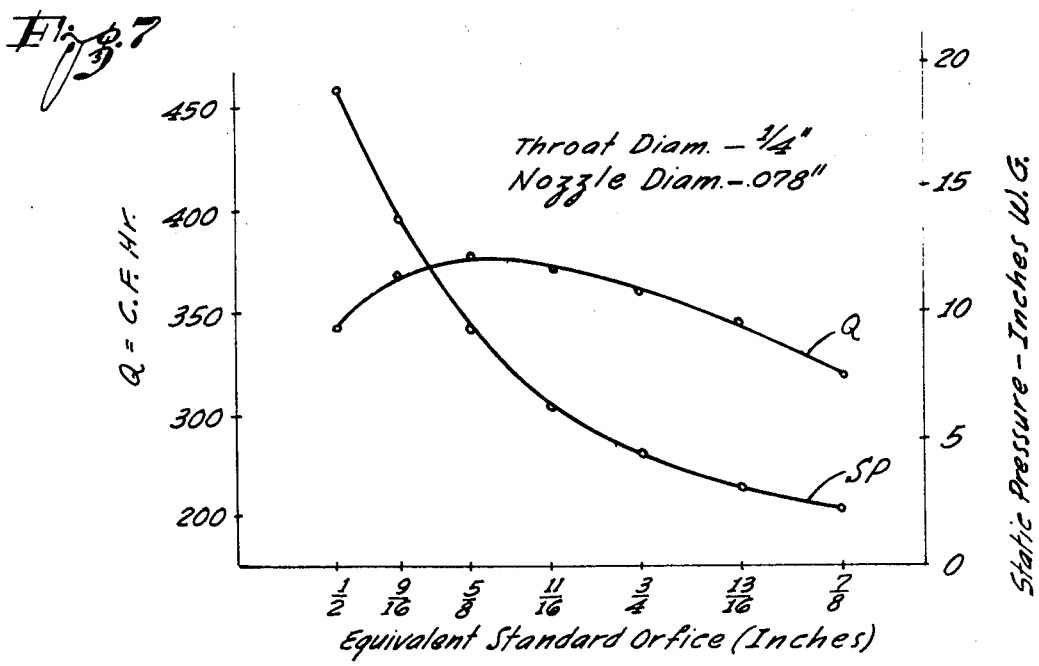
FIG. 7 illustrates two measured curves respectively representing pressure in a thawing chamber and rate of flow of steam and air as a function of various equivalent standard size orifices approximately representing different venting outlet sizes for a thawing chamber charged with a steam-air mixture.

The curves plotted in the several figures will aid in the detailed description of my solution to the problem which is, how to apply a sufficient amount of thermal energy to a frozen piece of food without cooking it, and in a rather short period of time. From a physics standpoint, this problem presents itself in this manner. The frozen piece of food has a surface which is an interface of a solid body with the environment. From a point in the environment remote from this interface heat has to be supplied to a point in the interior of the piece, which has to be regarded as being also remote from the interface. Hence, one can distinguish between three phases of heat transport: (1) from the remote point in the environment (or heat source) to a point in the vicinity of the surface; (2) from that latter point into the interface or surface of the piece of food, and (3) from the latter surface region into the interior of the piece of food including the center thereof as the area remotest from the surface. The interior can be regarded as a heat sink for the thawing process itself. In the following these three phases shall be discussed in detail.

It is apparent, that one has control over the last phase or process only to the extent of influencing the surface temperature, the heat conduction mechanism itself as it takes place in the interior of the piece of food is determined solely by the physical characteristics of the food. The situation is entirely different for the transport of heat through the environment (Phase 1) and into the surface of the piece of food to be thawed (Phase 2). Here now we turn to the particular condition set, namely, that the transport of heat to the surface must not provide a surface temperature at which the piece of food will cook. Accordingly, the heat supply process must be such that the temperature of, for example, meat remains below 170° F. for thawing periods of, say, 15 to 20 minutes or below.

It is apparent, that the heat conduction phase (2) i.e., the supply of heat onto and into the surface of the frozen piece sets the critical operating condition, as the development of thermal energy in or on the surface will determine the surface temperature of the food, and the food must not cook as long as the heat transport continues. Particularly it is essential that the entire amount of heat needed to thaw the entire piece of food has to be applied to the surface of meat before any cooking may begin. Thus, phase 2 shall be described first.

For this phase 2 I have chosen to use the phenomena of condensation, as this is by far the fastest mechanism to transport heat from a point in the exterior of the surface onto the surface itself. A condensate has at the instant immediately succeeding condensation the same temperature the vapor had at the instant prior to condensation. Thus the heat content of the vapor occupying a rather large volume prior to condensation is directly and suddenly available on the surface and as precipitation, whereby the condensate occupies only a very small volume, permitting rapid transfer of the same heat content from the small amount of condensate to the cooler surface itself. The thermal energy content in a given volume of steam adjacent the surface is thus transferred from the environment at the "speed" of the volume contraction due to the condensation, onto the particular surface on which the condensate is formed. This is a heat transport resembling an implosion, and is far superior to any conduction by any kind of molecular transport mechanism of thermal energy.

The vapor to be brought into engagement ultimately determines the surface temperature of the surface of the object on which the condensate develops. The vapor when coming into contact with the frozen piece of food should, therefore, have a temperature below a short term cooking temperature, as the surface of the food will tend to assume the temperature of the condensate.

It follows from the foregoing, that the vapor as brought into the vicinity of the food to be thawed should yield maximum possible condensation at a long term cooking temperature as defined. This is obtained by selecting the vapor pressure so that for the particular operating temperature the vapor can be at equilibrium with the liquid phase of similar temperature. As long as the surface on which the condensate is formed is colder than that temperature, there will be immediate heat exchange between the condensate and the surface. The condensate is cooled so that the vapor contacts the liquid phase at a temperature lower than required for equilibrium. Thus condensation will continue as long as the surface is cooler.

A vapor pressure different (higher) from the one for which there is equilibrium with the liquid phase of like temperature is impractical, as any condensate formed on the cool surface would at first tend to evaporate again and thus withdraw thermal energy from the condensate. This would necessarily reduce the total heat transport per unit time as compared with the transfer of heat by condensation substantially without reevaporation.

Due to its high latent heat of vaporization water vapor, i.e., steam is most suited. For operating temperatures as envisioned here, 140° to 170° F. the water vapor pressure is below atmospheric pressure for equilibrium conditions with the liquid phase. However, the thawing process cannot be carried out in a below atmospheric pressure environment because of venting requirements, and because flow of steam is needed to replenish the precipitated vapor. Thus, the steam must be mixed with a gas; and here I found air to be the most suitable gas.

A steam-air mixture having a temperature so that the steam at its partial pressure is in equilibrium with water of like temperature is a steam saturated mixture. Thus, I induce thawing by subjecting the frozen food to a flow of a saturated steam-air mixture. The mixture of air and steam used thus has a dew point which constitutes the operating temperature. This dew point and operating temperature is selected in the range of long term cooking temperatures, below any short term cooking temperature of, for example, meat. The definition of "short term" thus includes the approximate period of time needed for maintaining this condensation process for completion of thawing, and it is basic to the discovery I made, that this steam process of applying thermal energy to the frozen food needs to last only for so short a period that no cooking will ensue.

Steam will precipitate by condensation, as long as a mixture of air and steam at saturation, contacts the surface of the food. The surface thereof will heat up faster than obtainable with any other type of conduction, while it is ensured that the surface of the food will not cook if the flow of steam is terminated sufficiently early.

An operating temperature and dew point of 140° to 150° F. of a mixture of steam and air as it flows around the food during thawing is most suitable and can be obtained by providing initially a steam-air mixture having about 2.5 to 3.5 pounds of air per each pound of steam. When such a mixture is brought into intimate contact with a piece of frozen food, one obtains the fastest possible transfer of heat to the surface of the piece of food without cooking it.

One can see the following: A steam-air mixture having that operating temperature, but being not saturated, contains, therefore, less vapor, and less vapor per unit volume would be available for condensation so that the heat transfer is necessarily less than if saturated steam were used. Moreover, condensate may tend to evaporate thus withdrawing thermal energy. An increase in the amount of steam available for condensation requires necessarily an increase of the temperature which is not desired, because cooking is to be avoided. Thus, saturated steam at a long term cooking temperature provides optimum conditions of heat transport according to phase 2.

Without going into details at the moment as to quantitative details, FIG. 1 shows two curves, A and B, each representing the transfer of heat by means of condensation onto a surface at the several temperatures thereof as plotted along the abscissa. The two curves differ by a parameter which is the operating temperature and dew point for saturated steam. The selected values are 161° and 168° F. respectively. The ordinate shows values representing B.t.u. per hours.

Thus, these curves represent quantitatively the mechanism of condensation with which heat is transferred onto the surface. These curves have been actually measured, by exposing a plate of 52 inch$^2$ to the flow of saturated steam. The yield in condensate is an accurate measure for the heat of vaporization thus transferred onto the surface. To facilitate measuring a metallic plate was used, but condensation is independent from the material forming the surface for condensation, so that the curves are representative for all kinds of food. The curves result from interpolation and each actual measured value was obtained by maintaining the surface temperature at the respective temperature-abscissa value for a sufficient period of time, so that the accumulated condensate could be determined very accurately.

The curves A and B show the dependency of the heat transfer by condensation upon the surface temperatures. These curves are interesting in that the transfer of thermal energy by means of condensation is at maximum for surface temperatures considerably below the temperature of the steam-air mixture. During thawing, the surface temperature is, of course, determined by the balance of heat inflow by condensation, and conduction into the interior. It follows, therefore, that the maximum amount of thermal energy enters the piece of food when the surface is still quite cool. When the surface has attained the temperature of the steam, condensation ceases, or more precisely, condensation and evaporation will be at equilibrium. Further details of these curves A and B shall be discussed below and on several occasions.

Phase 1 of the conduction of thermal energy is now a problem of steam transport. In order to obtain a suitable air-steam mixture in the vicinity of the piece of food to be thawed, it is necessary to generate steam, mix it with air at the desired ratio, and then the steam-air mixture must be transported from a point or region of its generation which is remote from the piece of food to be thawed, to the vicinity of the surface thereof. The generation of the steam-air mixture itself will be described later, and in the following paragraphs the transportation of the steam-air mixture shall be described.

The piece of food to be thawed must be placed in a chamber which permits intimate contact between the steam of the steam-air mixture and the surface of the food. As steam condensate thus precipitates, the steam content is diminished, so that the steam in the chamber must be continuously replenished. More particularly, since the system establishes optimum conditions for condensation at the permitted operating temperature, the condensation very efficiently tends to deplete the mixture of its steam content, so that vigorous replenishing is needed to make fresh steam available continuously in the vicinity of the surface where the condensate is formed.

From a general point of view, it is thus necessary to establish an overall flow pattern around the piece of food to be thawed, so that the steam-air mixture has components of flow normal to substantially all of the surface elements of the piece of food to be thawed. This can be accomplished by providing several injectors blowing towards the food from all sides. However, it is simpler and quite efficient to inject the steam-air mixture into the chamber in a manner which promotes turbulence and sets up a vigorously turbulent flow. In its simplest manner the steam-air mixture is injected into the chamber at a pressure in excess of atmospheric pressure, and a venting outlet is provided in the chamber which communicates with the outer atmosphere. Thus, the venting outlet draws the steam-air mixture from its area of injection. The piece of food is supported in the chamber so that the resulting flow completely, or at least substantially envelopes the food. Thus the flow path in the chamber between the point or area of injection and the point or area of venting must be selected to run in the vicinity of the piece of food to be thawed, i.e., towards and/or parallel to the sides of predominant extension of the piece, and the steam-air mixture must to a predominant extent be forced to follow that flow path. This way, the means flow directly and/or the turbulent cross currents have flow components normal to substantially the entire surface of the food to be thawed.

The turbulence can be established already in the mixing stage for steam and air. Furthermore, the injection of steam and air is coupled with such an enlargement of the cross-sectional area of flow to thereby increase the turbulence in the injected mixture. Due to the turbulent flow along the surface of the piece of food, the desired steam content is maintained in the vicinity of the surface in spite of the continuous precipitation of vapor by condensation.

It is important, that steam is not permitted to hover over this surface as that would diminish the steam content available for condensation quickly and would reduce the condensation so that in turn the amount of latent heat liberated is reduced. Thus, it is an essential element that by turbulent flow of the steam-air mixture along substantially the entire surface of the food, all surface portions receive fresh steam to maintain a strong condensation.

Throughout the process of steam-air injection the temperature of the mixture will be lowered by the thawing process. There are also various other factors involved in the lowering of the temperature of the mixture in the chamber. Of course, there are some losses to the environment in general. Secondly, not only latent heat is transferred to the cold piece of meat, but there is also the regular heat transport by molecular conduction. Thirdly, the mixture is injected in a manner that there is a sudden increase in cross-sectional flow area, the volume available for the mixture expands. The resulting expansion of the air-steam mixture is to some extent adiabatic and, therefore, lowers the temperature of the steam-air mixture. All these factors, however, can be taken into consideration when selecting the temperature of the injected steam-air mixture.

Figure 2:
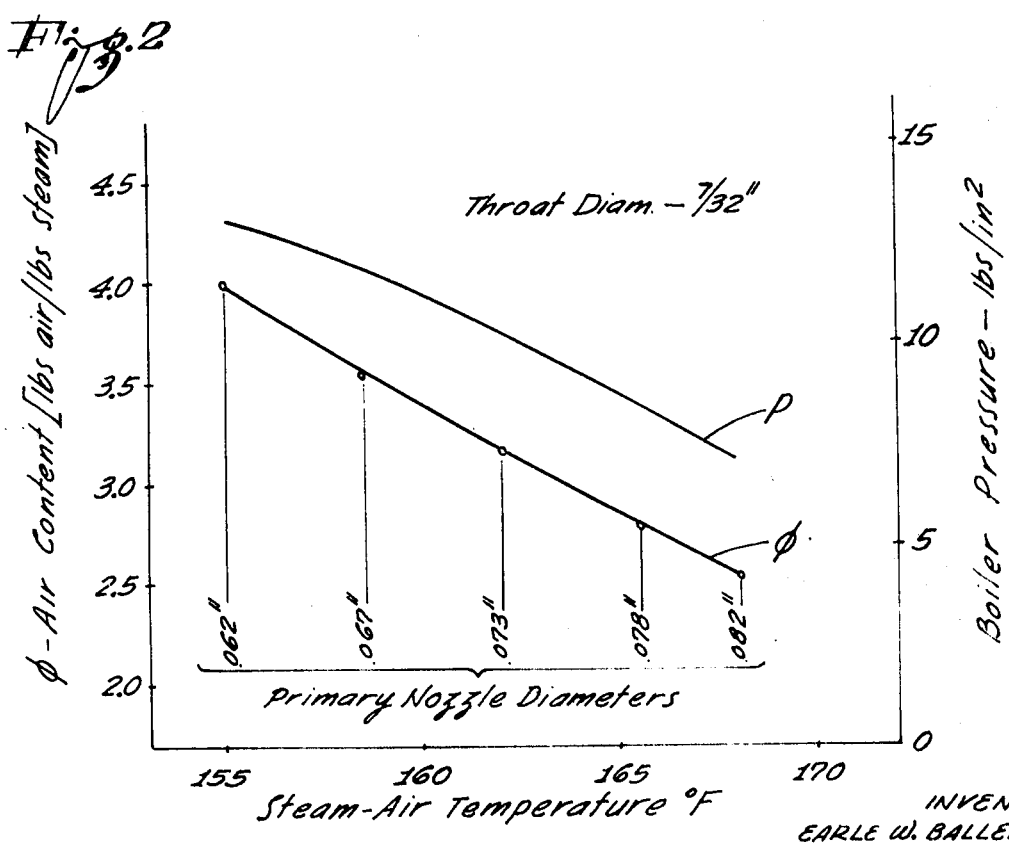
FIG. 2 illustrates as a function of time the surface temperature and the chamber temperature as measured when the thawing chamber is charged with an air-steam mixture having 159° F. prior to injection into the thawing chamber.

Turning now to the graphs, FIG. 2, curve $\Phi$ illustrates actual measurements of air-to-steam ratios over a suitable temperature range. Steam was produced in a boiler and mixed with air, and the resulting several ratios are plotted as ordinate values. The temperature values used as abscissa for plotting the curves are measured at the injector exit, i.e., prior to occurrence of the adiabatic expansion. The operating temperatures in the chamber after expansion will be somewhat below, i.e., about 10° below the temperature of injection, which is shown representatively in FIG. 3. This FIG. illustrates also actual measurements made, when a steam-air mixture was blown into a chamber containing a piece of frozen meat.

Curve D in FIG. 3 represents the temperature of the steam-air mixture in the chamber, which was injected at a temperature of 159° F. Curve D includes all temperature lowering effects exerted on the steam-air mixture after injection. The mixture in the chamber has a temperature initially about 20° below the temperature of injection (159° F.) but as the chamber heats up generally, the temperature of the mixture rises to about 150° F.

The curve C in FIG. 3 represents the corresponding rise in surface temperature of a frozen piece of meat. The rise in temperature is, of course, due to intimate and continuous contact of the surfaces with steam as the condensate is formed.

The curves A, B, C and D of FIGS. 1 and 3 together now represent a quantitative representation of a portion of phase I and of phase II of the thermal transport problem. Within the general definition given above, phase I includes the transport of latent heat by turbulent flow of steam-air mixture into the vicinity of a piece of food to be thawed, and phase II is the condensation of water vapor on the surface of this piece of food. The curves thus show, that the thermal energy in form of a turbulent flow of a steam-air mixture can be transported speedily into the vicinity of a cold piece of meat, and by operation of condensation, thermal energy is transferred speedily to the meat producing a rapid rise in the temperature of the surface (curve C). Concurrently large quantities of the thermal energy are conducted into the interior of the piece of food, because the curves A and B show that maximum thermal energy is transmitted to the surface at temperatures below, say 130° F.

The significance of the curves of FIGS. 1 and 3 resides in the fact, that thermal energy can be transmitted from a steam-air mixture to such an extent that the surface temperature of a medium rises quite rapidly. The curves are even more significant when looked upon against prior measurements. E. Langden published in 1931 results of his experiments on the heat transfer on condensation of air-steam mixtures with air contents varying between 0 to 0.2 pounds of air per pound of steam. Consistently this data shows a sharp drop in the heat transfer for an increase in the content of air. From an extrapolation of these prior curves one could conclude that the heat transfer for such a large proportion of air as presently envisioned would be negligible. The curves plotted in FIGS. 1 and 3, however, show the fact that in spite of the deterioration of the heat transfer characteristics for an increasing air content, a rapid raise in surface temperature can, in fact, be achieved. That concurrently enough thermal energy for thawing flows into the interior of the food will be described later.

From the foregoing, it follows that a fast transfer of thermal energy to the surface of a frozen piece of food without cooking its surfaces can be obtained by providing steam and mixing it with air so that the mixture is about saturated and has a temperature of about 160° to 170° F. The latent heat of the steam is the prime carrier of thermal energy. The mixture is brought by turbulent flow into contact with substantially the entire surface of the food. By condensation heat is transferred to the surface of the food without cooking it, and the turbulent flow along the surface of the food replenishes the steam as fast as it condensates.

In view of the relative high amount of latent heat (536 cal./gram or 1100 B.t.u. per pound) of steam, the heat transfer by condensation is considerably higher than what could be achieved by conduction. Moreover, to obtain comparable results of heat transfer by molecular transport to the surface of the meat, the temperature gradient required to be established would be so high, necessarily cooking the surface.

I shall now proceed in describing the phenomena observable as far as conduction of heat into the interior of the piece of food is concerned. The reason for this analysis is to determine to what extent the fast heat transfer to the surface of the food operates for thawing of the piece of food in its entirety. I shall thus develop how the thermal energy enters the frozen piece of food. An exact analysis would require solving the differential equation for heat conduction, which would involve extensive mathematics, because the melting process would enter into the formulas as a heat sink of variable size, and because I found that the pertinent thermal properties for the flow of heat and temperature propagation differ for frozen and for thawed meat. For the present case it suffices to proceed qualitatively and on the basis of differential approximations.

I consider the meat as being divided into laminae running parallel with the surface of the meat. The surface lamina is the one which receives directly the heat in accordance with the characteristics shown in FIGS. 1 and 3. Initially, the surface of the meat may have a temperature of about 0° F. The heat flux into and through the first surface lamina will determine its temperature. During a first period of time that heat flux is about linearly proportional to the thermal conductivity $\kappa$ of the frozen piece of food, which, for beefsteak I have measured to be 0.0036 in c.g.s. units. Since at this point nothing has been thawed, the same conductivity prevails throughout the meat. FIG. 4a represents that state schematically. The temperature rise in the first lamina and in succeeding laminae is then proportional to the heat flux and the inverse product of density $\rho$ and specific heat C having values 1.12 and 0.43 respectively (in c.g.s. units). Thus the temperature rise is proportionate to $\kappa \rho/C$ commonly called the diffusivity and having a value for frozen beefsteak of 0.00745 (c.g.s.). This diffusivity thus determines the speed with which the temperature of the frozen food may increase as long as frozen and up to the thawing point, by operation of conduction.

Turning back to the surface laminae, during the first time interval considered the temperature of this laminae will rise to the thawing point, which is below 32° F. due to the fact that the frozen liquid in the meat is an aqueous solution of various salts. As a matter of fact, due to the different types of material that make up a piece of meat, one cannot speak of a thawing (or freezing) point for meat as an exact temperature value. There is rather a softening that begins at about 27° F. and is completed at about 30° F.

A second time interval now succeeds the first time interval and its duration is determined by the time it takes a particular volume of this laminae to receive the amount of heat equal to the heat of fusion so as to undergo complete thawing. I have measured a value of 46.2 calories per gram of frozen beefsteak, which is 57.7 percent of the value of the heat of fusion of ice crystals. This can be regarded as a rather high value. FIG. 4b schematically illustrates a cross section into the interior of a piece of meat during this second time interval for the surface laminae.

A third time interval will succeed the second one. The surface laminae have thawed and increased in temperature. This is shown in FIG. 4c and FIG. 4d. The flux of heat in the first, surface lamina will be linear with the conductivity of thawed meat, which I found to be 0.0036 (c.g.s.) or about 31.4 percent of that of frozen meat. The influx of heat will increase the temperature of this laminae from about 30° to 32° F. up to a value which depends on the time the surface is subjected to the steam-air mixture. The temperature increase is again proportional to the heat flux and inversely proportional to the density and specific heat product, i.e. the diffusivity of the thawed meat.

For thawed meat I have measured $C=0.73$ and the density of thawed beefsteak is 1.17, all in c.g.s. units. Thus, the diffusivity is 0.0013. This value now determines the speed of temperature rise in the thawed meat. Thus, there is the amazing fact that the diffusivity of frozen beefsteak is 6.6 times the value of thawed beefsteak. The differential equation of heat conduction can be written in a manner which does not show explicitly any constants and coefficients for materials by substituting for "time" the product of diffusivity and time. Thus the spreading of a particular thermal condition is 6.6 times faster in frozen meat than in thawed meat.

Take now any laminae, in each of them, there is a first period during which the temperature rises up to the thawing point, this first period is necessarily the longer the deeper is the laminae underneath the surface, and it will have maximum duration for the center laminae. The temperature rise, however, is determined in accordance with the high value of diffusivity for frozen meat. The second period is the one during which the laminae absorbs the heat required for fusion to undergo thawing. The third period is that during which the respective laminae increases in temperature in accordance with the low value for the diffusivity of thawed meat.

I have measured the thawing process in a very thick piece of meat and the result is plotted in FIG. 5. The ordinate shows meat temperature and the abscissa time. The parameter for the group of curves plotted is depth, with curve E representing again the surface temperature. The steam-air mixture was injected with a temperature of 168° prior to turbulent expansion in the thawing chamber. The curves should actually all originate at a common temperature as the meat when in a deep freezer for some time will have a constant temperature throughout. However, some time elapsed between the taking of the meat out of the freezer and the setting up of the measuring equipment.

A critical evaluation of these curves reveals clearly the suitability of steam-air for thawing of meat. The time zero in this diagram was the time in which a steam generating boiler produced enough steam to be mixed with air, so that the mixture had the operating temperature of 168° prior to injection into a thawing chamber and heating thereof. The FIG. 5 now reveals, that the turbulent flow together with the condensation produces not only a rapid rise in the surface temperature but induces a considerable influx of thermal energy into the interior. On the basis of curve A shown in FIG. 1 it follows that as soon as the flow of steam and air begins, immediately there is a high influx of heat into the meat. From curves such as F, G and H in FIG. 5, one can see now that the high diffusivity of the frozen food results in a rapid propagation of heat into the interior, and within a few minutes there is a rapid temperature rise in a meat layer about one-half inch thick and before the surface temperature has exceeded 130° F. Below 130° F. meat cannot possibly cook on a long term basis, let alone in the few minutes that have elapsed since the frozen meat was placed into the chamber.

On the other hand, one can see that for greater depths, curves I, K and L, it becomes noticeable that further influx of heat is impeded by two factors. After about, say 15 minutes, thermal energy traveling towards the interior has to travel through large portions of thawed meat where the diffusivity is only 15 percent of that of frozen meat, so that the temperature can rise in these thawed portions only very slowly. Thus, the temperature gradient in the thawed meat is quite low and this accounts for the slow rise in temperature in the interior. Moreover, the surface temperature when above about 130° diminishes the influx of heat by condensation.

By comparing FIGS. 4 and 5, one can see that initially, heat conduction into the interior of the meat (FIGS. 4a, 4b) is quite fast, so is the setting up of a thawing zone on the surface of the meat. As the process continues over several minutes, the thawing zone deepens at first and then begins to propagate into the interior. The speed of propagation of this thawing zone then slows down due to the poor diffusivity of thawed meat, because further heat has to travel through the thawed surface and subsurface zone which deepens continuously.

From an analytical standpoint, therefore, a truly fast thawing process is limited to those situations in which the period of conduction in thawed meat in the outer laminae is not long before the actual thawing has begun in the laminae remotest from the surface. The thawing zone should reach the center of the meat before the thawed surface and subsurface zone is too thick. A steep rise in the external surface temperature during the time of conduction through thawed meat of the outer laminae counteracts to some extent the low diffusivity in the thawed meat, and as long as the surface temperature is still low, there is a large influx of heat. The heat flow thus increases with the increasing temperature gradient as thus set up in the thawed meat portion, but when the surface temperature begins to level off, the low diffusivity in the thawed portion becomes the controlling factor as the temperature gradient in the thawed portion will begin to decline while the heat influx diminishes also. Thus, the meat should have a thickness so that thawing is completed in about 10 or at the most 15 minutes.

FIG. 6, curve M, now shows the thawing time of the center (and thus the time of completion of thawing) of several pieces of round steak, having different thickness plotted as abscissa values. The ordinate shows time, and an injection temperature of 157° was used. The curve verifies numerically what had been concluded qualitatively earlier, namely that thawing time increases drastically with size, but is very small for meat of, say 1-inch thickness and below. A practical limit is a piece of meat having about 1-¼-inch thickness requiring about 12 minutes actual thawing time.

About 5 to 6 minutes are required for thawing meat about seven-eights inch thick which is the standard size for most supermarkets. If meat is too thick it will not thaw very fast since the slowness of the propagation of heat through thawed meat takes over. This does not render the present method useless, but for too thick pieces of meat its advantage over other methods of thawing will diminish. Here one has to consider also the fact that for the chosen temperatures of steam (150° to 170° F.) some cooking will occur if that steam is applied for hours. However, it will be appreciated, that in any event the thawing will still be better, even for very thick pieces of meat, than obtainable with excessive surface temperatures, or merely with room temperature.

FIGS. 5 and 6 illustrate a very interesting aspect. A piece of meat about 1-inch thick will thaw in about 8 to 9 minutes provided the steam-air mixture envelopes the meat completely, so that the deepest layer to the thawed is about one-half inch from the flat surface. The curve K in FIG. 5 shows that more than an hour will elapse before the heat has traversed about 1 inch down from the surface. Thus if one would cover one surface completely, for example placing it on a pan, that same piece of meat would take about an hour to thaw.

It is further interesting to compare this thawing process with relatively low temperature steam cooking, which requires, of course, the establishing of cooking temperatures, throughout the food to be cooked in this manner. Here the temperature increase propagates through the meat at any time only at the low diffusivity for thawed meat. If the surface temperature begins to rise to a value close to the steam temperature, the transmission of heat from the steam to the surface will be very small, so that the temperature propagation for small heat inflow and at a low diffusivity is very slow. For steam thawing, there is an initial period when the temperature propagation through the meat depends on the high diffusivity of frozen meat while concurrently the still rather low surface temperature permits maximum transfer of thermal energy to the surface by condensation as shown in FIG. 1, curves A and B.

Now it has to be observed that for thawing, the center never has to reach the surface temperature, but only about 30° to 32° F. For cooking, the center has to be heated up to the cooking temperature. Thus, it is proven that the inherently slow process of low temperature steam cooking cannot at all be compared with steam thawing. The surprising fact results that steam thawing is a very fast process indeed and this is due to the fact that considerable quantities of thermal energy are developed on the surface and can enter and penetrate the interior with a rather high diffusivity.

Having described the method, in general, an apparatus shall be described which can be used with advantage for practicing the invention.

FIGS. 8 and 9 illustrate a fast thaw device for home use. There is provided a boiler 10 having, for example, a flat bottom 11 for placement on a gas stove or an electric cooking range. The boiler 10 is closed except for two openings. The opening 12 defines an inlet port for filling the boiler with water. The water should be accurately dosed because no more water is needed than is necessary for evaporation during the period of time required for completely thawing a particular piece of meat. During thawing operations the opening 12 is closed, for example, by means of a threaded stopper 13 so that the interior of the boiler 10 can communicate with the exterior of the boiler through a pipe 15 only.

Pipe 15 terminates in a nozzle 17 which pertains to an ejector 20 and serves as primary nozzle. The dimensioning of the nozzle opening is critical as will be developed in detail below. The pipe end 15 is partially enveloped by a sleeve 19 also enveloping the flared inlet 22, which is the secondary nozzle of the ejector 20. Inlet 22 is positioned coaxial with nozzle 17. The sleeve 19, furthermore, has an opening 18 for admitting air to the ejector. The opening 18 is laterally disposed in relation to both the primary nozzle 17 and the inlet or secondary nozzle 22 of the ejector 20.

As heat is supplied to the boiler the water therein begins to evaporate and finally will come to a boil. A steam jet will be expelled in upward direction from the nozzle 17 as a free jet. The resulting pressure drop in the vicinity of the nozzle outlet operates for suction of air to be sucked through the opening 18 so that the air as well as steam enters the secondary nozzle 22 of the ejector 20. The secondary nozzle 22 leads into a cylindrical portion 24 which defines a constant area mixing device of the ejector 20 in order to produce a homogeneous steam-air mixture. Experiments conducted at MIT have led to the conclusion that constant area mixing in a tube having a length of about seven times its diameter produces a highly homogeneous mixture.

The constant area mixing chamber 24 leads into a diffuser 26 terminating in an outlet 28. The diffuser angle is about 8° as it offers minimum losses for the conversion of velocity head into pressure in the diffuser. The pressure head produced at the outlet of diffuser 26 is dependent upon the boiler pressure. However, the mixing ratio Φ of air and steam is independent from the boiler pressure. I have found, that a length of the diffuser about 10 times its inlet diameter produces a pressure head at the diffuser outlet which is sufficiently high for the inventive purpose. The diameters of diffuser inlet and outlet have a ratio of 2:4.

The ejector 20 thus constitutes a combined pump, mixer and turbulent promoter. It pumps air at atmospheric pressure to the diffuser outlet, with the pressure head being in excess of atmospheric pressure. The ejector further provides a mixture with steam and homogenizes it by strong turbulence. A homogenized flow of air and steam mixture leaves the opening 28 with a pressure above atmospheric pressure to enter a deflection chamber 30, which can be regarded as an antechamber for the thawing chamber 34. Thus, the ejector 20 operates as injector for the thawing chamber. Spacer and support rods 14 separate the bottom 32 of the thawing chamber 34 from the top of the boiler to prevent undue heating of the thawing chamber in excess of the desired operating temperature.

The opening 28 is defined by an opening in the bottom plate 32 of the thawing chamber 34. The deflection chamber 30 is centrally located on this plate 32 and has a horizontal top 31 and laterally oriented openings 33 which deflect the vertical, turbulent flow of the steam-air mixture into horizontal directions. The openings 33 are arranged around a cylindrical circumference of the deflection chamber 30, and, therefore, provide a radially outwardly directed flow of the steam-air mixture, in all directions and away from the axis as defined by the ejector 20. It follows, therefore, that the ejector 20 terminates in a region producing a sudden enlargement of cross-sectional area with regard to the flow of the steam-air mixture. As this is coupled with a deflection, strong turbulence is further provided in the flow.

There are next provided a number of vanes 36 which serve as a means to enforce a more or less uniform distribution in radially outwardly directed flow of the steam-air mixture. The vanes 36 have upper surfaces 38 which together with the top 31 of the deflection chamber 30 define a horizontal surface 40, which is a supporting surface for a piece of meat, such as 42, to be thawed. The meat is placed flat on the vanes 36. The vanes 36 have radially outwardly directed dimensions so that the steam-air mixture is in fact guided rather uniformly radially and close to the inner cylindrical surface of a cover 44. Cover 44 and bottom plate 32 together define the thawing chamber 34.

The cover 44 has an opening 46 through which projects a sleeve 48 providing an upper venting outlet 49. Sleeve 48 can be raised or lowered and thus can be loosely seated on top of the piece of meat 42 to be thawed. The sleeve 48 has legs so that openings 50 are defined between sleeve 48 and the meat. The thawing chamber 34 communicates with the outer atmosphere exclusively through these openings. Thus, the steam will be collected to pass through the openings 50 for exhaust through the venting outlet 49.

Since by operation of the ejector-injector 20 a relatively high pressure is established in the deflection chamber 30, there is a pressure gradient as between, for example, the inlet openings 33 for the thawing chamber and the venting opening 49 where, of course, atmospheric pressure prevails. Thus, the steam-air mixture will travel from the openings 33 by turbulent flow along the under surface of the piece of meat 42, around its sides, along the top, to be collected by the centrally located openings 50.

A piece of meat such as 42 when placed on the surface 40 is completely enveloped by a turbulent flow of steam-air mixture. It is an important aspect that deflection chamber 30 is not very big, and it is also important that these top surfaces 38 of the vanes 36 are in fact rather narrow, at most a few millimeters or less, so that only a small portion of the underside of the meat is not exposed to the turbulent flow. The vanes 36 may be mounted on a separate plate 35 of smaller diameter than the bottom plate 32, leaving a circumferential trough in which condensate may collect.

It should be mentioned that all of the curves as discussed above and as shown in FIGS. 1 through 6 have been measured with the aid of the steam producing and ejecting equipment shown in FIGS. 8 and 9.

The total heat content of the steam as injected into the thawing chamber is divided between pressure energy and thermal energy including the latent heat, and the proportion will vary with the size of the primary nozzle. The pressure head at the diffuser exit is primarily dependent on the boiler pressure, and the cross-sectional area ratio as between diffusion entrance and exit. As the steam-air mixture leaves diffuser exit 28, the effective cross-sectional area is rapidly enlarged coupled with a deflection of the flow so that heavy turbulence is set up in the flow as it spreads radially outwardly underneath the meat 42 in the channels as defined by the vanes 36. As mentioned earlier, FIG. 3, curve D, illustrates, for example, the temperature in the chamber 34 for a nozzle of 0.067-inch at a boiler pressure of 11 p.s.i. and an ejector steam-air temperature 159°. The curve C, also shown in FIG. 3, illustrates the concurrent rise in temperature of the surface of the meat to be thawed.

It is an important aspect of the thawing apparatus as illustrated, that the flow from the ejector when flowing over the surface of the meat has a higher concentration in the center of the surfaces of predominant extension than at the outer rim. Particularly the collection of the steam on centrally located orifices 50 favors a higher steam density in the central surface portion of the meat. This ensures a rather uniform thawing process because the outer portions of the meat are also bounded by its rim through which heat flows also. The top 31 of the deflection chamber provides some shielding of the center, this was found advisable as a direct hitting of the meat by the ejected steam-air mixture may cause some juice extraction and too fast a heating of the center region which is also not desirable. Now some practical consideration should be given to the operation of the device shown in FIGS. 8 and 9.

The first aspect to be considered is, that for using this equipment as a home or household appliance, there is a limitation in the available heat sources. Electric range elements usually are wired for a maximum load of 2,150 watts; smaller wall receptacle type heaters are usually limited to 1,500 watts, and the maximum size gas range burners develop 9 to $10.10^3$ B.t.u. per hour. This limits the maximum rate of generation of steam. Of course, the total amount of steam developed by the boiler 10 will depend on the amount of water available for evaporation. One will use as little water as possible in order to shorten the time between application of heat to the boiler and the development of sufficient pressure therein for the generation of the steam-air mixture.

I found that a seven-eighths inch thick steak requires the vapor of about 8 oz. of water, and a 1¼-inch thick steak will require the vapor of about 26 oz. of water. Thus, a boiler when placed on the gas range at maximum flame, will evaporate 8(26) oz. of water for the time it takes a seven-eights inch (1¼-inch) thick steak to thaw. The starting time of the thawing process can be defined, when about 10 to 12 pounds in.$^2$ pressure has been developed for a nozzle 17 of 0.067-inch diameter. The boiler 10 was used on a gas range and had a diameter of about 10 inches made of aluminum. I found that 8 oz. of water took about 2 minutes to develop the operating pressure of about 10 lbs./inch$^2$; for 26 oz. the time was about 6 minutes. For an average of about 16 oz. of water, the pressure rose by about 1 p.s.i. every 10 seconds. The maximum pressure reached will be independent from the amount of water, as the difference in volume in the pressure chamber for the different amount of water is negligible.

The maximum operating pressure has been reached in the boiler when there is thermal equilibrium in the boiler. This equilibrium is established between the steam production and steam discharge. One can always assume that the user of the thawing device will use maximum heat output of the range or stove so that the variable equipment factor for the pressure at equilibrium is the size of nozzle. For a 0.067-inch nozzle and a maximum size gas range the operating pressure is about 12 lbs./inch$^2$ and about 1.4 fluid oz. evaporate for each minute of operation.

The curve N in FIG. 6 now depicts total thaw time for a 0.067-inch nozzle, which is the combined starting time and the actual time of thawing as shown in curve M. The starting time was measured when for each piece of meat having a thickness in accordance with the abscissa value plotted in FIG. 6, just the right amount of water was filled into boiler 10.

It is an interesting aspect, that the device includes inherently a timing device. The amount of water in the boiler can be selected so that it is evaporated after the particular period needed for thawing, whereafter the production of steam ceases. The nozzle 17 produces an audible whistling noise as long as steam is being produced and injected in the thawing chamber. When the whistling noise ceases, the water supply is exhausted, and if it was properly metered, the meat will be thawed, Thus, the user will be furnished with a chart showing the amount of water needed to thaw a piece of food having a particular thickness.

I now turn to a discussion of suitable operating ranges. As stated above, curve Φ in FIG. 2 shows mixing ratio as a function of temperature of the ejector outlet prior to adiabatic expansion. The figure now shows additionally, as parameter, various nozzle sizes used for establishing these ratios and temperatures. FIG. 2 shows additionally the boiler pressure P. Of course, the boiler pressure must go down, for the same rate of heat influx for the boiler, when one selects a larger size for the nozzle 17. One can see that the content of air decreases with increasing size of primary nozzle 17, the throat of the secondary nozzle 22 remaining constant.

It should be emphasized, that two basic distinctions must be made. An ejector of this type produces a mixing ratio, which depends only on the primary-secondary nozzle ratio, and not on the pressure of the source to which the primary nozzle is connected. Thus, for a given nozzle arrangement the mixing ratio Φ and the temperature of the ejected mixture is independent from the boiler pressure if the latter varies. On the other hand, for a given boiler, as is here the case, the pressure varies with nozzle size, and thus it appears from the curves in FIG. 2 as if the mixing ratio also varies with the boiler pressure, which is not the case. Curve Φ and curve P can thus individually be interpreted as a function varying with the nozzle size, but these curves cannot be interpreted in that mixing ratio per se varies with pressure.

Of course, the temperature increases with a decreasing content of air in the mixture, and one can see, that for primary nozzles of about 62 mils to about 82 mils with a secondary nozzle of seven thirty-seconds throat diameter one covers a range of about 155° to 168° F. steam-air temperature measured at the exit 28 of the ejector 20. In terms of primary to secondary nozzle diameter ratio, this is about 0.014 to 0.018.

Of course, the actual nozzle sizes, in inches, have meaning only with the particular boiler and heat source used, and the figures here are related to an equipment design for a home use thawer and the normally available heat source in the home. The primary, and equipment-independent characteristic is the curve Φ, representing air-steam ratio in dependence upon temperature. For an ejector as mixing device, the area ratio for the primary and secondary nozzles is the variable equipment factor of principal importance. The nozzle sizes themselves enter into the consideration only for realizing this curve Φ for a heat source as available in the normal household kitchen.

Bearing this in mind, I found that for a nozzle size of 62 mils, the performance was noticeably poorer, i.e., slower than for a nozzle of 67 mils so that a mixing ratio of about 1:4 (air to steam) having a dew point about 155° is approximately the lower limit of a satisfactory performance. I found further that for nozzles of 86 mils and larger the turbulence is not too vigorous any more and performance likewise dropped.

From curve P in FIG. 2 one can see that the boiler pressure goes down with the nozzle size, and the pressure head at the diffuser outlet will go down accordingly; thus the driving pressure for the flow of steam and for the steam-air mixture goes down, and this accounts for the weakening of the turbulence and the corresponding deterioration of performance. However, this again is bound to the particular type apparatus chosen.

From this it follows, that if a larger heat source were available, the operating pressure in the boiler could be increased. This would not influence the mixing ratio, if the same nozzles are used. However, an increasing boiler pressure may permit that a primary nozzle larger than 82 mils can be used and this may well offer still satisfactory performance, although operating temperatures close to 200° F. may, even for a few minutes thawing time, produce some surface cooking.

From all this it follows that primary nozzle sizes above 62 mils and below 86 mils produce very satisfactory and quite uniform results, based on the assumption that household type ranges are used as heat source. For a larger heat source, for the same size secondary nozzle, a wider primary nozzle and a corresponding lower air content can still be used satisfactorily. Ejectors producing a steam content in air of less than one-fourth of the air content will, however, generally not operate very fast.

Having determined the most suitable range for the nozzles of the ejector, I found further that a distance of the primary nozzle 16 from the plane of the throat of the secondary nozzle should be about one-sixteenth inch. For this distance the free jet emerging from nozzle 17 has enlarged its diameter to the width of the mixing tube 24 right where the flared portion of the secondary nozzle 22 merges into the mixing tube.

The cooperating conditions can be optimized by a still further aspect. The thawing chamber 34 as it extends from the ejector outlet 28 to the venting outlet 49 is a load for the ejector operating as a pump. This load can be defined by an equivalent standard orifice. It is well apparent from the drawing that the size of the outlets 50 when small constitute the predominant component of the regular load on the ejector-pump when charging the thawing chamber, so that the total area size of the outlets 50 becomes quite comparable with an equivalent standard orifice.

I have used an ejector of the type described with a primary nozzle 17 of 78 mil and a secondary nozzle 22 of one-fourth inch throat diameter, and I have connected the outlet of this ejector to work against a single orifice constituting the load. As plotted in FIG. 7, I varied the size of the orifice and measured the pressure head at the ejector outlet 28 (curve SP) and the rate of flow (curve Q) of the steam-air mixture. One can see the following interesting points.

For too large an equivalent standard orifice, corresponding to a large venting opening as defined by all apertures 50, the rate of flow is quite low. This is detrimental to the transport of sufficient steam into and through the thawing chamber. For too small an equivalent orifice as venting outlet of the system, the outlet operates as a throttle, and the pressure in the thawing chamber will go up operating as back pressure which retards the outflow of steam. The flow curve Q has a maximum for a particular equivalent standard orifice of about five-eighths inch diameter. Moreover, the maximum is not very pronounced, and one can see that an outlet area of the chamber ranging from about one-fourth to one-eighth square inch gives the optimum flow rate for the steam-air mixture. A variation in the primary nozzle size within the operating ranges given above will not materially alter this result.

For fast thawing in accordance with the inventive method and apparatus it is important that the food be exposed at all sides to the turbulent flow of the steam-air mixture. This means in particular that turbulent motion and/or the average flow must have consistently components directed towards all sides of the food so that fresh steam is made available continuously for condensation. The equipment shown in FIG. 8 realizes this concept, but permits deduction of generalized principles for this heat exchange between food and the steam-air air mixture. Here, two points are of particular importance. First, the piece of food to be thawed must be supported somehow in the thawing chamber, and, second, the piece of food should be oriented in relation to inlet and outlet to achieve the desired objective, namely, a fast and uniform thawing in the best possible manner.

The vanes 36 in the thawing chamber must have a rather thin upper edge, so that the area of contact with the piece of food is very small, and very little of the surface of the piece of food is not exposed to the turbulent flow. The flow fans out from the chamber 30 radially outward all along the lower surface 42a except for the small areas covered by the supporting vanes. There is continuously turbulent cross movement due to turbulent mixing transverse to the lower surface 42a of the food removing air depleted with steam from the surface regions and replenishing the surface regions with fresh steam.

The mixture is then directed upwardly by the sidewalls of the chamber, and thus there is also heat inflow into the rim portion 42c of the food. A return flow close to the upper surface 42b is the next requirement. The principal operating component here is the collector tube 48 defining the venting openings 50 directly in the vicinity of the upper surface 42b of the meat. This simple expedient dispenses with the requirement that the top of the chamber is very close to the top surface of the met. Some space is needed here to accommodate the different sizes (thicknesses) of the food to be thawed. Due to the adjustability of the tube 48 in the vertical direction the exhaust of the steam-air mixture is always concentrated in the vicinity of the upper surface of the food to be thawed regardless of the size of the piece to be thawed. This means that all of the steam-air mixture is forced to converge in that area of collection. Therefore, the flow path in the upper portion of the thawing chamber has components tangentially along the upper surface of the piece of food, and additionally the steam-air mixture will descend from the upper chamber, towards the upper surface 42b of the piece of food.

If the exhaust tube is located centrally to the food the steam and air mixture will also converge horizontally towards the center of the upper surface. This is important because there is also condensation near the rim 42c and heat will thus flow laterally into the food, so that without further measures the thawing would progress, not uniformly, up from the surface 42a and down from the surface 42b, towards the interior but the centroid of the piece of food (42d) would thaw later than the central portions near the rim. However, the concentration of steam on the center of the top surface 42b promotes the thawing in the centroid region below the top surface.

At this point is necessary to refer particularly to the top 31 of deflection chamber 30. The principal purpose of this deflector is the prevention of the establishing of a straight flow path between diffuser outlet 22 and tube 48. In case small pieces of chicken, several hamburger patties or two pieces of steak are arranged side-by-side on the vanes, there are gaps in between them. Should such a gap be just above the diffuser outlet 28, then the mixture would be injected straight into the exhaust tube and, of course, the entire purpose of the device would be defeated. Thus, plate 31 forces the flow into a direction along the supporting surface 40 which is the area of predominant extension of the food to be thawed, be it flat piece of steak or several pieces of meat arranged on that plane 40.

As this top 31 is a shield against the steam, of course, plate 31 can be made removable, so that a single flat piece of meat when centrally positioned on the vanes 36 does in itself serve as flow deflector. If there are individual pieces of chicken, the top plate 31 will be positioned as stated, and need not be covered with chicken pieces. However, I wish to describe briefly the effect the top plate 31 may have when put in place and when meat is placed on top of it. As its surface is relatively large in comparison with the thin vanes 36, it may appear that here actually the thawing is retarded severely. However, I found that a rather hot jet from the ejector may actually thaw the center too fast when hitting the meat directly.

If the top 31 is made of a good heat conductor, such as aluminum, it will heat up quickly and transmit the heat also fairly well. It may be advisable to have top 31 extend somewhat above plane 40, so that contact of the food with the top surface of top 31 is ensured for good conduction. Moreover, the concentration of the return flow above that center actually more than offsets the impediment of condensation in the center region of the lower surface 42a.

In general, one can see that except for a food surface area directly, i.e., frontally intercepting the jet from the ejector, supporting surfaces covering surface portions of the food should not have a configuration so that rather large contiguous surface areas of the food are covered. Thus, it is better to use such relatively long but thin vanes than a plate even if covering a similar surface area for support. The rim 42c is entirely exposed, and the top surface 42b is also entirely exposed except for the few squares millimeters where the legs of the tube 48 sit on the food.

The ejector as well as exhaust of the steam-air mixture is preferably arranged at central portions of the surfaces of predominant extension of the food for reasons of symmetry of the flow pattern, as this is conducive for a uniform thawing process. It follows that an injection of the steam-air mixture preferably should be normal to the predominant extension of the food so that the flow can fan out tangentially rather uniformly and omnidirectional along that side of the food facing the jet.

A horizontal position of the food is preferred for a variety of reasons as, for example, meat when placed in a vertical position, would sag after thawing has progressed to a substantial degree. Moreover, individual pieces of cutup chicken cannot be stacked vertically. Of course, one could hang meat if this is conveniently possible. In this case practically the entire surface would be exposed. The steam may then be injected and vented laterally.

An injection of the steam-air mixture towards a rim portion and a respectively oppositely positioned venting outlet is possible and could provide similar parallel flow patterns along the sides, but I found that the process is not as uniform as in case the arrangement is as aforedescribed, and uniformity is essential for speed. In particular, the general design features as outlined above, ensure a uniform progression of the thawing zone from all sides into the interior. I explained above with reference to FIG. 5, how the thawing process slows down the deeper it has to go. Thus, for a fast and uniform thawing it is essential that each of the innermost points in a piece of meat is reached by thermal energy coming from the closet surface point. Innermost points are those having maximum distance from the closest surface point and for flat pieces of meat these innermost points form a large area which should thaw concurrently. This can be insured only if all the surface portions through which heat for thawing the innermost points must travel receive uniformly high amounts of thermal energy. This condition is fulfilled if the centroid of the food is placed colinear with inlet and outlet of the thawing chamber as well as with those surface portions of the piece of food closest to the centroid. The arrangement of inlet and outlet and of the supporting elements for the food as described meets these conditions.

I found it unsatisfactory to use the top of the boiler directly as the bottom of the thawing chamber, because this would tend to unduly heat the supporting elements for the food in the chamber. The thermal energy for thawing should be applied to the surface of the food substantially solely through the steam air mixture, and not otherwise. For this reason the bottom of the thawing chamber should be thermally insulated from the top of the boiler, as maximum heat is applied to the latter for most efficient thawing. As shown I have provided sufficient space between the thawing chamber and the boiler by means of the spacer and support rods 14, and the air occupying this space serves as the insulator. This also removes the thawing chamber 34 from the heat source, so that heat source will not or only to a small extent heat the bottom of the thawing chamber. On the other hand, one can see that when the device as illustrated is placed on a cooking range, particularly on a gas stove, the heating source causes a strong convective flow of hot air upwards from the sides of the boiler along the sidewalls of the thawing chamber. Thereupon these sidewalls are heated up. This is very desirable for the following reason. Also, some heating of the bottom is desirable for the same reason.

The heating process precedes the thawing process as it takes some time for the water in the boiler to heat up sufficiently for developing appreciable quantities of steam. During this period there is little heating of the interior walls of the thawing chamber. On the other hand, the external convection flow begins to heat the outer wall of the thawing chamber right from the instant of placing the boiler on the flame. The spacing of the thawing chamber 34 from the flame or other heat source prevents excessive heating of the walls. This is particularly important if the thawing device is heated with a flame of a gas stove, because the external convective flow of air induced by the laterally deflected flames is much more vigorous than in case of an electric range, and the appliance should be useable on both kinds of ranges. Thus, the sidewall of the thawing chamber should be so thick and should consist of a suitably adapted material, so that during a period of heating of, say, 10 to 20 minutes, the sidewalls will not excessively exceed the interior operating temperature of the chamber as determined by the steam-air mixture. However, this is not a critical selection for the thawing chamber and materials and wall thickness as commonly used for kitchenware are satisfactory. More important is that the vertical stacking of boiler and thawing chamber permits some preheating of the latter as the sidewalls of the thawing chamber are conveniently exposed to the convective flow as set up by the heating source as ascending from underneath the boiler. During the water-heating process the sidewalls of the thawing chamber will already heat up, so that the first portion of the steam air mixture when entering the thawing chamber and contacting the sidewalls will not lose much thermal energy; there will be some but not too much condensation, so that the steam-air mixture flowing over the top surface 42b of the frozen piece of food is not unduly depleted of steam. Thus, for a home appliance, it is of functional importance to place the thawing chamber on top of the boiler, so that lateral outflow of heat (in form of convection) from underneath the boiler envelopes the thawing chamber at its sides, preheating it and thus reducing losses drastically which in turn speeds up the thawing process.

The limitation as to heating of the thawing chamber externally applies only for the expected period of thawing. Thus, the sidewalls (as the portions most exposed to the convective flow from the heat source) should not excessively exceed the internal operating temperature for the contiguous period, so that the temperature of the interior of the thawing chamber remains below short term cooking temperatures of the food to be thawed. Whether or not the sidewalls of such a kitchen appliance would heat up to a higher temperature when on the stove for hours is quite immaterial. If desired, the space between the bottom 32 of the thawing chamber and the top of the boiler may be enclosed by a wall (see wall 51). For reasons of appearance it may be advisable to have boiler, and/or thawing chamber in one enclosure designed to appear as one contiguous flush body. Of course, such an enclosure should have at least one opening (such as 52) as the secondary nozzle 22 of the ejector requires communication with the environmental air. This opening should be remote from the boiler, as the air of the turbulent mixing device should not be too warm. The mixing ratio as provided by the ejector depends on the density of its components, and the density goes down with temperature (for the same pressure). On the other hand, and as was already mentioned above, the appliance should be usable for electric as well as for gas ranges; the air around the device becomes warmer for the latter type of heating source than for the former type. An air admitting opening remote from the boiler and from the heat source thus ensures some uniformity of temperature of the admitted air as the differences in air temperatures for the two types of heating sources will be prevalent in the immediate vicinity of the boiler.

The inventive method and principal features of the apparatus are also applicable for large scale thawing. Meat may be placed on long thin rails spaced an inch or two apart, and several injecting nozzles as well as exhaust vents are positioned so that again there is a turbulent flow along all sides. Separate injection and exhaust systems can be provided for opposite sides, as it is not essential that the flow from one and the same injection nozzle covers all of the surface, as long as substantially the entire surface is enveloped by turbulent flow of air and steam. The inventive method is also applicable for a continuous process type operation in that food is placed on a belt made of thin strands, and then there are numerous injectors blowing the steam-air mixture towards the food from all sides as it passes along. The speed of the belt can be made adjustable to accommodate differently sized meat, so that the thawing time needed can be regulated by adjusting the total time a piece is subjected to the injectors. Deeply frozen food can thus speedily be prepared for restaurant use.

The invention is not limited to the embodiments described above but all changes and modifications thereof not constituting departures from the spirit and scope of the invention are intended to be covered by the following claims:

I claim:

1. for defining device for fast thawing of frozen food without cooking, comprising:
   means for generating steam;
   means in communication with the steam generating means to mix the steam with air;
   a thawing chamber having inlet and outlet, the inlet communicating with the mixing means to receive the steam-air mixture at a pressure for inducing flow towards the outlet, the outlet communicating with the exterior; and
   means in the thawing chamber for supporting a piece of food in relation to the inlet and outlet of the chamber so that the flow of the steam-air mixture from inlet to outlet substantially unrestrictly envelopes the entire surface of the piece of food.

2. A device for thawing frozen food, comprising:
   means for positioning a piece of frozen food in a manner leaving substantially the entire surface of the piece exposed;
   means for directing a mixture of steam and air substantially towards the piece when positioned by the positioning means, so that substantially the entire amount of steam-air mixture as so directed is forced to flow along at least one side of predominant extension of the piece of food, the predominant direction of the flow running tangentially along that side; and
   means defining a thawing chamber to enclose said positioning means and having an inlet for communication with the directing means, and having means defining an outlet positioned in relation to said directing means and to said positioning means so that the steam-air mixture when flowing towards the outlet predominantly flows towards and along the remaining sides of the piece.

3. A device for fast thawing frozen food comprising:
   means for providing a vapor at a particular temperature;
   means for mixing this vapor with a gas at a ratio to establish a dew point above lowest temperature for cooking of the food to be thawed;
   means for placing the food to be thawed for contact with the gas-vapor mixture; and
   means for providing unrestricted turbulent flow along substantially the entire surface of the food to be thawed.

4. A device for fast thawing frozen food, comprising:
   means for providing an air-steam mixture with the content of air in excess of the steam content at a dew point substantially in excess of normal room temperature; and
   means for providing a flow of said mixture unrestricted over substantially the entire surface of the piece of food to be thawed.

5. A device for thawing frozen food, comprising:
   means defining a thawing chamber;
   means in the thawing chamber for supporting a piece of frozen food in a particular manner leaving substantially its surface exposed in the chamber;
   means for directing a steam-air mixture towards a central region of one side of predominant extension of the piece of frozen food, so that the steam-air mixture is deflected to flow from the central region along the one side towards the rim thereof; and
   means for collecting the steam-air mixture in the chamber at a central region of the respective opposite side of the piece of food for exhaust of the mixture from the thawing chamber.

6. A device for thawing frozen food, comprising:
   means defining a thawing chamber having inlet and outlet;
   means for supporting a piece of food in the chamber defining means and including guiding means defining a flow path in the vicinity of at least one of said inlet and outlet along at least one of the sides of predominant extension of a piece of food when supported by the supporting means, the respective other one of the inlet and outlet being located so that a flow path in the chamber as between inlet and outlet is completed in the vicinity of and along substantially the entire surface of the piece of food; and
   means for injecting a mixture of steam and air into the chamber through said inlet thereof and in a direction relative to said flow path, so that the steam and air mixture predominantly follows said flow path from inlet to outlet and at directions having components tangential to the extension of the surface of the piece of food.

7. A kitchen appliance, comprising:
   a boiler for receiving water;
   an ejector coupled to the boiler for producing a steam-air mixture of a dew point below the boiling of water at atmospheric pressure but in excess of a minimum cooking temperature for meat;

a thawing chamber coupled to the ejector so that the steam-air mixture as produced by the ejector discharges into the chamber;

means in the chamber for supporting a piece of frozen food in the chamber, in relation to the ejector outlet so that the steam-air mixture as discharged by the ejector flows centrally towards one side of the piece of food when in the chamber; and means for collecting the steam-air mixture centrally from the vicinity of the other side of the piece of food for exhaust from the chamber.

8. A home appliance, comprising:

a boiler for receiving water;

an ejector coupled to the boiler for producing a steam-air mixture of a dew point below the boiling point of water at atmospheric pressure but in excess of a minimum cooking temperature for meat;

a thawing chamber coupled to the ejector so that the steam-air mixture as produced by the ejector discharges into the chamber;

a plurality of supporting elements in the chamber for supporting a piece of frozen food in very small sized areas of contact with the piece and being positioned in relation to the ejector outlet for guiding the steam-air mixture substantially over one side of a piece of frozen food when supported by the vanes; and means for collecting the steam-air mixture in the vicinity of the respective opposite side of the piece of food for exhaust from the chamber.

9. A device for fast thawing frozen food, comprising:

means for providing an air-steam mixture with the content of air in excess of the steam content and at a dew point substantially in excess of a minimum cooking temperature;

means for positioning a piece of frozen food leaving substantially its entire surface exposed; and means for providing for contact between the steam and air mixture and a piece of food when positioned by the positioning means, so that the steam-air mixture has flow components normal to substantially all of the exposed surface portions.

10. A device for fast thawing of frozen food, comprising:

means for supporting a piece or pieces of frozen food in a horizontal plane leaving substantially the entire surfaces of the piece or pieces exposed, and the piece or pieces so supported having downwardly directed surface portions on the supporting means and upwardly directed surface portions;

means for providing a steam-air mixture;

means for defining a thawing chamber;

means for providing an injection of the steam-air mixture into the thawing chamber; and means for providing venting of the thawing chamber, one of the injection providing means and of the venting means being located centrally to the downwardly directed surfaces of the piece or pieces of food, the other one of the injection means and of the venting means being positioned centrally to the upwardly directed surface portions of piece or pieces of the frozen food.

11. A device for fast thawing frozen food, comprising:

means for positioning a piece or pieces of frozen food leaving substantially the entire surface or surfaces exposed, the piece or pieces defining a centroid;

means directing a flow of mixed steam and air towards the piece or pieces and at a location substantially towards the centroid, so that at least a portion of the surface or surfaces deflects the flow; and means defining a thawing chamber for receiving the supporting means and having an exhaust position colinear with the centroid and said direction, so that the flow of steam and air substantially envelopes the entire surface or surfaces as exposed.

12. A kitchen appliance, comprising:

a boiler for receiving water;

an ejector coupled to the boiler for producing a steam-air mixture of a dew point below the boiling of water at atmospheric pressure but in excess of minimum cooking temperature for meat;

a thawing chamber coupled to the ejector so that the steam-air mixture as produced by the ejector discharges into the chamber;

means in the chamber for supporting a piece of frozen food in the chamber, in relation to the ejector outlet so that the steam-air mixture as discharged by the ejector is forced to flow along at lease one side of predominant extension of the piece of food; and means for collecting the steam-air mixture for exhaust from the chamber, and at a location so that the flow path extends along all sides of predominant extension of the piece of food.

13. A home appliance, comprising:

a boiler for receiving water and for placement on a conventional heating source such as provided by a kitchen stove;

means defining a thawing chamber above the boiler, being insulated therefrom, the thawing chamber having venting means, the sidewalls of the thawing chamber being exposed for convective flow of heat resulting from placement of the boiler on the heating source; and means for conducting the steam as produced in the boiler, into the thawing chamber and intimately mixing the steam with air, so that a steam-air mixture enters the thawing chamber having a temperature below the boiling point of water at atmospheric pressure.

14. A kitchen appliance, comprising:

a boiler for receiving water and for placement on a conventional heating source such as provided by a kitchen stove;

means defining a thawing chamber positioned in thermally insulating relationship to the boiler, insulation being established at least to the extent that the thawing chamber will receive heat from the boiler and the heating source insufficient to raise the temperature of the chamber to about the boiling temperature of water at least during a period in excess of the required period for thawing a piece of frozen food when placed in the chamber;

means for connecting the steam as produced in the boiler, into the thawing chamber and mixing the steam with air, so that a steam-air mixture enters the thawing chamber having a temperature below the boiling point of water at atmospheric pressure, the thawing chamber having venting means remote from the region where the steam-air mixture enters the thawing chamber; and means for supporting in the thawing chamber a piece or pieces of frozen food so that substantially its entire surface is exposed to the flow of the steam-air mixture from said region to said venting outlet.

15. A home appliance for thawing frozen food comprising:

a boiler for receiving water to be heated so that steam is being developed;

means defining a thawing chamber positioned in a particular relationship to the source of heat for the boiler so that at least a portion of the exterior surface of the thawing chamber is exposed to external flow of heat from the source; and means for mixing the steam with air and charging the thawing chamber with the mixture, so that the temperature of the interior of the thawing chamber as determined by the temperature of the steam-air mixture and of the external flow of heat, remains below the short term cooking temperature of the food to be thawed.

16. A home appliance, comprising:

a boiler for receiving water to be heated so that steam is being developed;

means defining a thawing chamber positioned above the boiler, and having inlet and venting means;

means for admitting air from the environment of the boiler and for mixing the steam as developed by the boiler intimately with said air and charging the thawing chamber through the inlet means with the resulting mixture.

17. A device for thawing and heating frozen food comprising:
chamber means vented to the atmosphere and including means for supporting frozen food;
means for providing a source of convective hot gases;
means for generating steam, said gases having a temperature higher than the temperature of the steam generated;
means for intermixing the steam generated with the hot gases externally of said chamber to form a homogeneous mixture; and
means for forcing the homogeneous mixture of steam and hot gases over the frozen food within said chamber means.

18. A device in accordance with claim 17 wherein the chamber means is heated by the means for providing said source of convective hot gases.

19. A device for thawing and heating frozen food comprising:
a thawing chamber;
a source of convective hot gases;
a boiler for generating steam;
an enclosed space in which a portion of said boiler surface is a first wall of said enclosed space, a second wall separating the interior of the enclosed space from said convective hot gases, said second wall having openings for controlling the temperature of the hot gases admitted into said enclosed space;
an ejector having an inlet connected to said enclosed space, whereby said ejector mixes steam and hot gases drawn from said enclosed space to form a homogeneous mixture and forces said mixture over frozen food supported in said thawing chamber.

20. A device in accordance with claim 19 whereby said thawing chamber is heated by said hot gases.

21. A device for thawing and heating frozen food, comprising:
means for defining a chamber;
means within said chamber for supporting frozen food;
means for providing a source of hot gases;
means for vaporizing water;
means for homogeneously intermixing said hot gases and water vapor externally of said chamber; and
means for forcing said homogeneously intermixed gases and vapor over the frozen food positioned on said supporting means.

22. A device for thawing and heating frozen food, comprising:
means for defining a thawing chamber having inlet and outlet means;
means for providing a source of convective hot gases;
means for generating steam;
means for defining an enclosed space;
means for controlling the admittance of hot gases into said enclosed space;
ejector means for mixing hot gases drawn from the enclosed space with steam from the steam generating means, and forcing a homogenized mixture of hot gases and steam over the frozen food supported in the thawing chamber.

23. A device in accordance with claim 22 whereby the thawing chamber is heated by the convective hot gases.